(12) United States Patent
O'Donnell et al.

(10) Patent No.: US 7,281,806 B2
(45) Date of Patent: Oct. 16, 2007

(54) SYSTEM AND METHOD FOR PROJECTING A VIDEO IMAGE WITH A TEMPORAL LED COMBINER

(75) Inventors: Eugene Murphy O'Donnell, Fishers, IN (US); Estill Thone Hall, Jr., Fishers, IN (US); James Edward Lyst, Jr., Indianapolis, IN (US)

(73) Assignee: TTE Technology, Inc., Indianapolis, IN (US)

( * ) Notice: Subject to any disclaimer, the term of this patent is extended or adjusted under 35 U.S.C. 154(b) by 331 days.

(21) Appl. No.: 11/149,051

(22) Filed: Jun. 8, 2005

(65) Prior Publication Data

US 2006/0279701 A1    Dec. 14, 2006

(51) Int. Cl.
*G03B 21/14* (2006.01)

(52) U.S. Cl. .......................... 353/94; 353/20; 348/742; 362/19; 362/231; 359/634

(58) Field of Classification Search .................. 353/20, 353/31, 34, 33, 37, 81, 94; 349/7, 8, 9; 348/742, 348/743; 359/495, 501, 634, 636, 638; 362/231, 362/234, 800
See application file for complete search history.

(56) References Cited

U.S. PATENT DOCUMENTS

| | | | |
|---|---|---|---|
| 3,971,931 A | 7/1976 | Jehle | |
| 4,977,355 A | 12/1990 | Rodriguez et al. | |
| 4,995,718 A * | 2/1991 | Jachimowicz et al. | ........ 353/31 |
| 6,639,631 B1 | 10/2003 | Hall, Jr. et al. | |
| 6,704,758 B1 | 3/2004 | O'Donnell | |
| 6,711,597 B1 | 3/2004 | O'Donnell | |
| 6,747,710 B2 | 6/2004 | Hall, Jr. et al. | |
| 6,755,536 B2 | 6/2004 | Tegreene et al. | |
| 6,837,584 B2 | 1/2005 | Drazic et al. | |
| 7,070,281 B2* | 7/2006 | Kato | ........................... 353/20 |
| 2003/0001811 A1 | 1/2003 | O'Donnell | |
| 2003/0020724 A1 | 1/2003 | O'Donnell | |
| 2003/0098835 A1 | 5/2003 | O'Donnell et al. | |
| 2003/0103171 A1 | 6/2003 | Hall, Jr. et al. | |

(Continued)

FOREIGN PATENT DOCUMENTS

EP    1499136 A1    1/2005

(Continued)

OTHER PUBLICATIONS

Boulder Nonlinear Systems, Inc., Ferroelectric Liquid Crystal Based Polarization Filters, May 9, 2001.

(Continued)

*Primary Examiner*—William C. Dowling
(74) *Attorney, Agent, or Firm*—Fletcher Yoder (57) ABSTRACT

The disclosed embodiments relate to a system and method for projecting video onto a screen. A video unit (10) comprising a first component (30) configured to create a first beam of light with a first polarity, a second component (40) configured to create a second beam of light with a second polarity subsequent to the creation of the first beam of light, and a third component (42) configured to allow the first beam of light pass through it without a change of polarity and to change the polarity of the second beam of light to the first polarity.

20 Claims, 5 Drawing Sheets

U.S. PATENT DOCUMENTS

| | | |
|---|---|---|
| 2003/0103193 A1 | 6/2003 | O'Donnell et al. |
| 2003/0132894 A1 | 7/2003 | O'Donnell et al. |
| 2003/0214637 A1 | 11/2003 | Drazic et al. |
| 2004/0027321 A1 | 2/2004 | O'Donnell |
| 2004/0036665 A1 | 2/2004 | O'Donnell |
| 2004/0051815 A1 | 3/2004 | Alpaiwalia et al. |
| 2004/0202003 A1 | 10/2004 | Lyst, Jr. |
| 2005/0002169 A1 | 1/2005 | Drazic et al. |
| 2005/0017938 A1 | 1/2005 | O'Donnell et al. |
| 2005/0046759 A1 | 3/2005 | O'Donnell et al. |
| 2005/0105176 A1 | 5/2005 | Lippey et al. |

FOREIGN PATENT DOCUMENTS

| | | |
|---|---|---|
| WO | WO01/43113 A1 | 6/2001 |
| WO | WO2006/013522 A2 | 2/2006 |

OTHER PUBLICATIONS

Huseyin Murat, Herbert De Smet, Sieter Cuypers, Youri Meuret, Hugo Theinpont, Michael Vervaeke, Lieven Desmet, Increased Lumens Per Etendue by Combining Pulsed LED's, SPIE vol. 5740, 2005.

* cited by examiner

SYSTEM AND METHOD FOR PROJECTING A VIDEO IMAGE WITH A TEMPORAL LED COMBINER

FIELD OF THE INVENTION

The present invention relates generally to projecting video images onto a screen. More specifically, the present invention relates to a system and method for projecting video images using multiple light emitting diodes.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection televisions create video images by varying the color and shade of projected light. One example of a projection television system is a liquid crystal display ("LCD") projection television. Another example of a projection television system is a Digital Light Processing ("DLP") system. DLP systems employ an optical semiconductor, known as a Digital Micromirror Device ("DMD") to project video onto a screen. DMDs typically contain an array of at least one million or more microscopic mirrors mounted on microscopic hinges. Each of these mirrors is associated with a point on the screen, known as a pixel. By varying the amount of light that is reflected off each of these mirrors, it is possible to project video images onto the screen.

Specifically, by electrically actuating each of these hinge-mounted microscopic mirrors, it is possible to either illuminate a point on the screen (i.e., "turn on" a particular micromirror) or to leave that particular point dark by reflecting the light somewhere else besides the screen (i.e., "turn off" the micromirror). Further, by varying the amount of time a particular micromirror is turned on, it is possible to create a variety of gray shades. For example, if a micromirror is turned on for longer than it is turned off, the pixel that is associated with that particular micromirror, will have a light gray color; whereas if a particular micromirror is turned off more frequently than it is turned on, that particular pixel will have a darker gray color. In this manner, video can be created by turning each micromirror on or off several thousand times per second. Moreover, by shining colored light at the micromirrors instead of white light, it is possible to generate millions of shades or color instead of shades of gray.

Conventionally, there are two main techniques to produce the light used in a projection television or video projector. First, the light may be created by a conventional lamp, such as an incandescent lamp, a halogen lamp, or an ultra high pressure mercury vapor lamp. There are many advantages to using LEDs (the second technique) instead of incandescent, halogen, or mercury vapor lamps. Specifically, LEDs are solid state components, and thus are typically more robust and more efficient, because they operate at lower temperatures. Moreover, because LEDs can generate specific colors of light, projection televisions employing LEDs typically do not use a color wheel. Unfortunately, a single LED cannot presently produce enough light to continuously project large video images, and conventional techniques for harnessing the light from multiple LEDs are typically inefficient. An efficient method for harnessing light from multiple LEDs to project a video image is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for projecting video onto a screen. A video unit (10) comprising a first component (30) configured to create a first beam of light with a first polarity, a second component (40) configured to create a second beam of light with a second polarity subsequent to the creation of the first beam of light, and a third component (42) configured to allow the first beam of light pass through it without a change of polarity and to change the polarity of the second beam of light to the first polarity.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
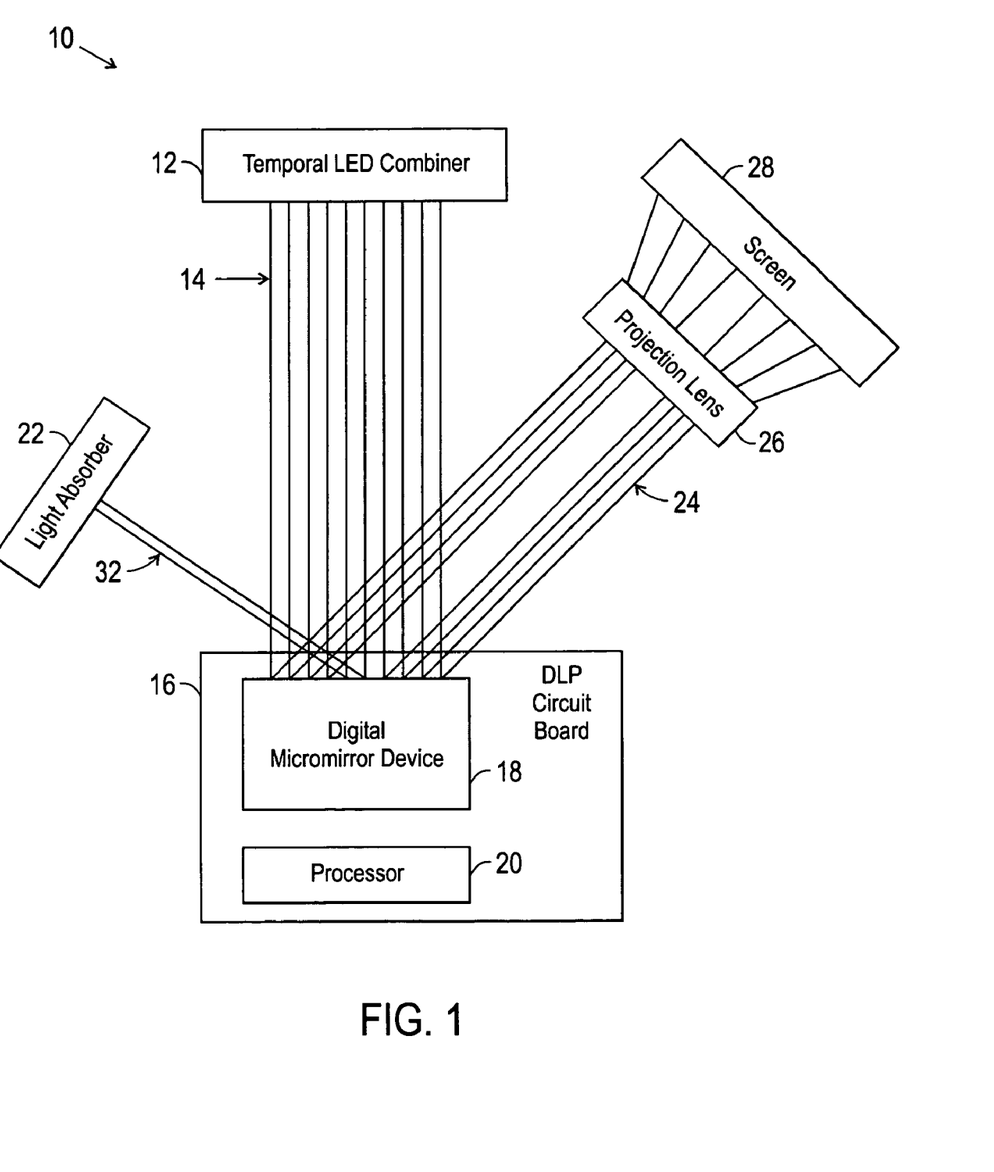
FIG. 1 is a block diagram of a video unit employing a temporal LED combiner in accordance with embodiments of the present invention.

FIG. 1 is a block diagram of a video unit 10 employing a temporal LED combiner 12 in accordance with one embodiment. In one embodiment, the video unit 10 comprises a Digital Light Processing ("DLP") projection television. In another embodiment, the video unit 10 may comprise a DLP-based video or movie projector. In still another embodiment, the video unit 10 may comprise another form of projection television or projection display, such as a Liquid crystal display ("LCD") projection television.

As will be described in greater detail with regard to FIGS. 2-7, the temporal LED combiner 12 may include multiple LEDs that are configured to project, shine, or focus colored light 14 at a digital micromirror device ("DMD") 18. In alternate embodiments, such as a black and white video system or a color wheel system, the temporal LED combiner 12 may be configured to produce a single color of light. As will be described in greater detail below, embodiments of the present technique may enable multiple LEDs within the temporal LED combiner 12 to be efficiently employed in combination with each other to create a sufficient amount of light to project relatively large video images onto a screen.

As illustrated, the temporal LED combiner 12 may project, shine, or focus colored light 14 at the DMD 18. The DMD 18 may be located on a digital light processing ("DLP") circuit board 16 arrayed within an optical line of sight of the temporal LED combiner 12. The DLP circuit board 16 may comprise the DMD 18 and a processor 20. As described above, the DMD 18 may comprise up to one million or more micromirrors mounted on microscopic, electrically-actuated hinges that enable the micromirrors to tilt between a turned on position and turned off position. In the illustrated embodiment, the DMD 18 is coupled to the processor 20. In one embodiment, the processor 20 receives a video input and directs the micromirrors on the DMD 18 to turn on or off, as appropriate to create the video image. In alternate embodiments the processor 20 may be located elsewhere in the video unit 10.

The colored light 14 that reflects off a turned on micromirror (identified by a reference numeral 24) is reflected to a projecting lens 26 and then projected on to a screen 28 for viewing. On the other hand, the colored light 14 that reflects off of a turned off micromirror (identified by a reference numeral 30) is directed somewhere else in the video unit 10 besides the screen 28, such as a light absorber 22. In this way, the pixel on the screen 28 that corresponds to a turned off micromirror does not receive the projected colored light 14 while the micromirror is turned off.

In one embodiment, the colored light 14 from the temporal LED combiner 12 rapidly changes from red to green to blue and then back to red many times per second. When the DMD 18 receives this stream of rapidly changing colored light 14, the micromirrors on the DMD 18 are directed rapidly turn on or off to create the video images. In one embodiment, this direction is provided by the processor 20. This rapid turning on and off of the micromirrors is coordinated to match the sequence of colors in the colored light 14. For example, when the colored light 14 is red, the micromirrors turn on or off as appropriate to generate the shades of red for a particular frame of video. Specifically, one micromirror may turn on for 25 microseconds to contribute one shade of red to its associated pixel while another one of the micromirrors may turn on for 30 microseconds to contribute another shade of red to a different pixel while still another micromirror may turn off completely for some period of time if no red light is to be projected to a particular one of the pixels during a particular frame. In a similar fashion, the micromirrors generate shades of green and blue, if needed, when the colored light 14 is green or blue, respectively. Those skilled in the art will appreciate that in alternate embodiments other colors of light may be employed besides or in addition to red, green, and blue.

Because these different colors of light are rapidly changing (e.g. 30 times per second), the viewer sees a cohesive image formed from the three colors of light on the screen 28. For example, to create a particular shade for a particular pixel, the micromirror corresponding to that particular pixel may turn on for 20 microseconds of red light, 22 microseconds of green light, and 17 microseconds of blue light. Alternately, the micromirror may turn on for 20 microseconds of red light and 20 microseconds of blue light, but remain turned off for green light. Those skilled in the art will appreciate that millions of color combinations can be projected by varying the lengths of time that the micromirrors are turned on.

The video unit 10 may also include the projection lens 26 to project the light reflected from the DMD 18 onto the screen 28. In one embodiment, the projecting lens 26 facilitates the projection of turned-on light 24 by expanding the turned-on light 24 to cover the relatively large area of the screen 28. In an alternate embodiment, the screen 28 may not be a part of the video unit 10. For example, the screen 28 may be mounted on a wall and the video unit 10 may include a projector configured to project video across a room to the screen 28.

As described above, the temporal LED combiner 12 may project, shine, or focus color light 14 at the DMD 18 to produce a video image. As described further below, the temporal LED combiner 12 may employ multiple LEDs in combination to generate enough light to project even relatively large video images. For example, the temporal LED combiner may employ multiple synchronized LEDs operating with a low duty cycle.

The duty cycle of an LED is the ratio of the time that the LED is turned on versus the time that the LED is turned off. Within certain limits, decreasing the amount of time that an LED is turned on versus the time that the LED is turned off (i.e., lowering the duty cycle) enables an LED to produce more light. In other words, the more time that the LED has to "rest" between light flashes, the brighter each light flash can be. For example, an LED that is always on (i.e., a duty cycle of one) cannot typically produce enough light to project a relatively large video image, but an LED that is only producing light one sixth of the time (i.e., a duty cycle of ⅓, ⅙, and so forth) may be able to generate enough light to project a relatively large video image. For this reason, the temporal LED combiner 12 is configured to employ multiple low duty cycle LEDs in synchronization with each other.

Figure 2:
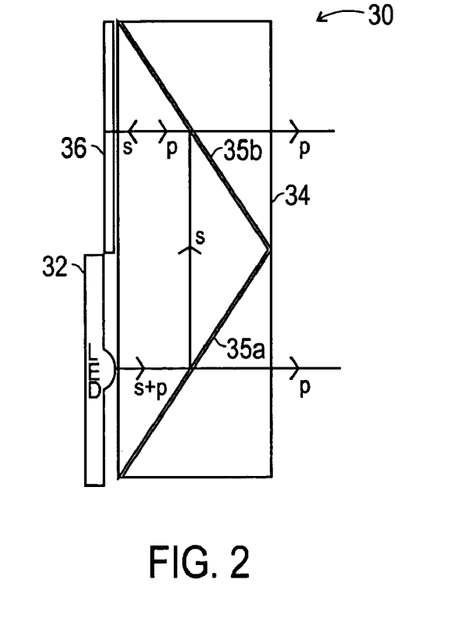
FIG. 2 is a diagram of an exemplary starting LED block from a temporal LED combiner in accordance with embodiments of the present invention.

The temporal LED combiner 12 includes multiple LEDs as well as other components to facilitate the synchronization of these multiple LEDs. For example, FIG. 2 is a diagram of an exemplary starting LED block 30 from the temporal LED combiner 12 in accordance with one embodiment. As illustrated, the starting LED block 30 may include an LED 32, a polarizing beam splitter ("PBS") prism 34, and a one-quarter wave plate reflector 36. The LED 32 may produce unpolarized light, which is illustrated in FIG. 2 as (s+p). When the unpolarized light hits PBS component 35a within the PBS prism 34, the unpolarized light will be divided into "p" polarized light and "s" polarized light. The p polarized light will pass through the PBS prism 34, and the s polarized light will be reflected to another PBS component 35b within the PBS prism 34. The s polarized light will then be reflected off the second PBS component 35b towards the one-quarter wave plate reflector 36. When the s polarized light reflects off the one-quarter wave plate reflector 36, it is converted into p polarized light, which can pass through the second PBS component 35b and out of the PBS prism 34. Accordingly, as illustrated in FIG. 2, the starting LED block 30 may produce two beams of p polarized light from the LED's (32) single beam in unpolarized light.

Figure 3:
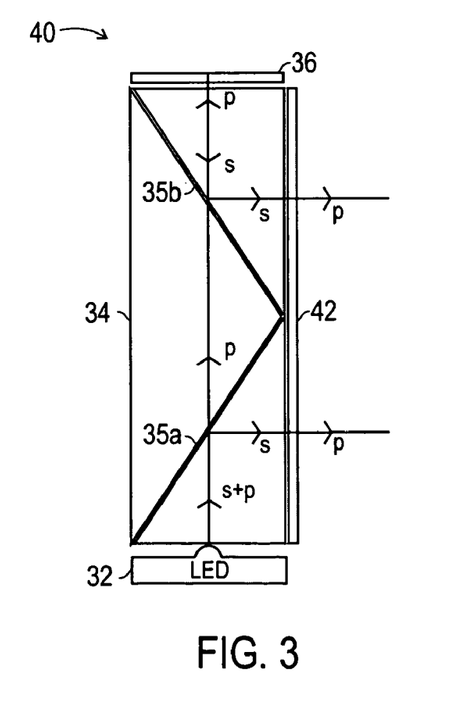
FIG. 3 is a diagram of an exemplary intermediate LED block from a temporal LED combiner in an active state in accordance with embodiments of the present invention.

Turning next to FIG. 3, a diagram of an exemplary intermediate LED block in an active state in accordance with one embodiment is illustrated and generally designated by a reference numeral 40. For simplicity, like reference have been used to designate those features previously described in reference to FIG. 2. As illustrated, the intermediate LED block includes the LED 32, the PBS prism 34 containing the first PBS component 35a and the second PBS component 35b, the one-quarter wave plate reflector 36, and a LCD polarization switch 42. As described above, the LED 32 may be configured to emit a beam of unpolarized light, which is illustrated in FIG. 3 as "s+p." This beam of unpolarized light, shines into the PBS prism 34. Upon making contact with the first PBS component 35a, the unpolarized light is divided into an s polarized light beam and a p polarized light beam. The s polarized light beam is reflected out of the PBS prism 34, and the p polarized light beam passes through both the first PBS component 35a and second PBS component 35b to reflect off the one-quarter wave plate reflector 36. When the p polarized light reflects off the one-quarter wave reflector 36, it is converted into s polarized light which then reflects off the second PBS component 35b and out of the PBS prism 34.

As illustrated in FIG. 3, the two beams of s polarized light exiting the PBS prism 34 passes into the LCD polarization switch 42, which is also referred to as the LCD shutter 42. Those of ordinary skill in the art will appreciate that LCD panels may be employed to selectively change the polarization of light beams. For example, the LCD polarization switch 42 can be employed to either change the polarization of a light beam entering the LCD polarization switch 42 or to allow light to pass through the LCD polarization switch without changing its polarity. In the active state intermediate LCD block 40, the LCD polarization switch 42 is configured to convert the s polarized light exiting the PBS prism 34 into p polarized light. As such, the illustrated intermediate LED block 40 is configured to generate two beams of p polarized light when the intermediate block 40 is in an active state.

Figure 4:
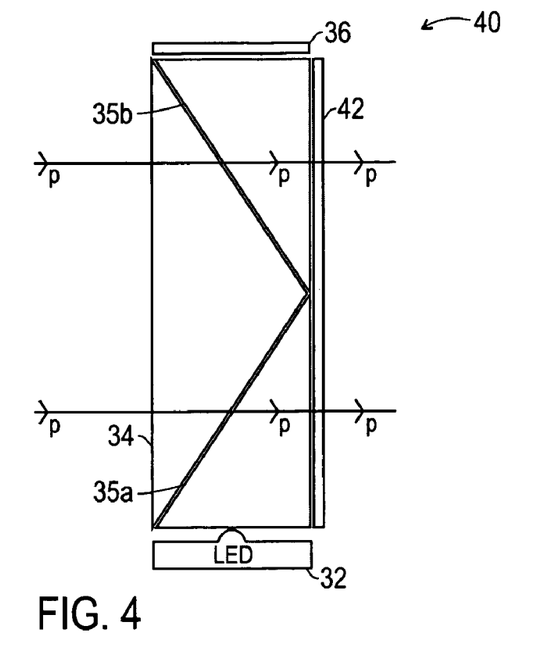
FIG. 4 is a diagram of an exemplary intermediate block from a temporal LED combiner in an inactive state in accordance with embodiments of the present invention.

FIG. 4 is a diagram of an exemplary intermediate block 40 in an inactive state in accordance with one embodiment. For simplicity, like reference numerals have been used to designate those features previously described in reference to previous figures. In the inactive state illustrated in FIG. 4, the LED 32 is off (i.e., not generating light), and the LCD polarization switch 42 is configured to allow p polarized light generated by other blocks to pass through it without changing the polarity of the p polarized light. As will be described further below, the ability of the LCD polarization switch 42 to selectively either convert s polarized light into p polarized light or to allow p polarized light to pass through the intermediate block 40 enables the temporal LED combiner 10 to synchronize the light from multiple LEDs 32.

Figure 5:
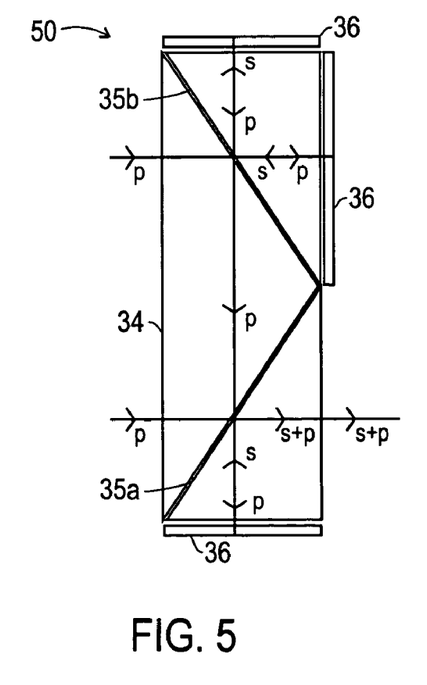
FIG. 5 is a diagram of an exemplary ending block from a temporal LED combiner in accordance with embodiments of the present invention.

As described above, the intermediate block 40 may either produce p polarized light or allow p polarized light to pass through. FIG. 5 is a diagram of an exemplary ending block 50 from the temporal LED combiner 12 in accordance with one embodiment. For simplicity, like reference numerals have been used to designate those features previously described in reference to previous figures. In one embodiment, the ending block 50 may be configured to convert the two beams of light generated by either the staring block 30 or one of the intermediate blocks 40 in an active state into unpolarized light (i.e., "s+p" light). As illustrated in FIG. 5, the ending block 50 includes the PBS prism 34 and a plurality of one-quarter wave plate reflectors 36. When p polarized light enters the ending block 50, the light beam illustrated at the top of FIG. 5 is reflected off the plurality of one-quarter wave plate reflectors (as illustrated) to produce s polarized light. This s polarized light is then combined with the other p polarized light beam (i.e., the lower beam in FIG. 5) to produce unpolarized light. This unpolarized light (i.e., the colored light 14 described above with regard to FIG. 1 can then be projected at the digital micromirror device 18. It is important to note that in alternate embodiments, the ending block 50 may be configured to produce light with a variety of suitable polarization characteristics. For example, if the temporal LED combiner 12 is employed in an LCD projection system, the ending block 50 may be configured to generate polarized light because polarized light is employed in LCD projection systems.

Figure 6:
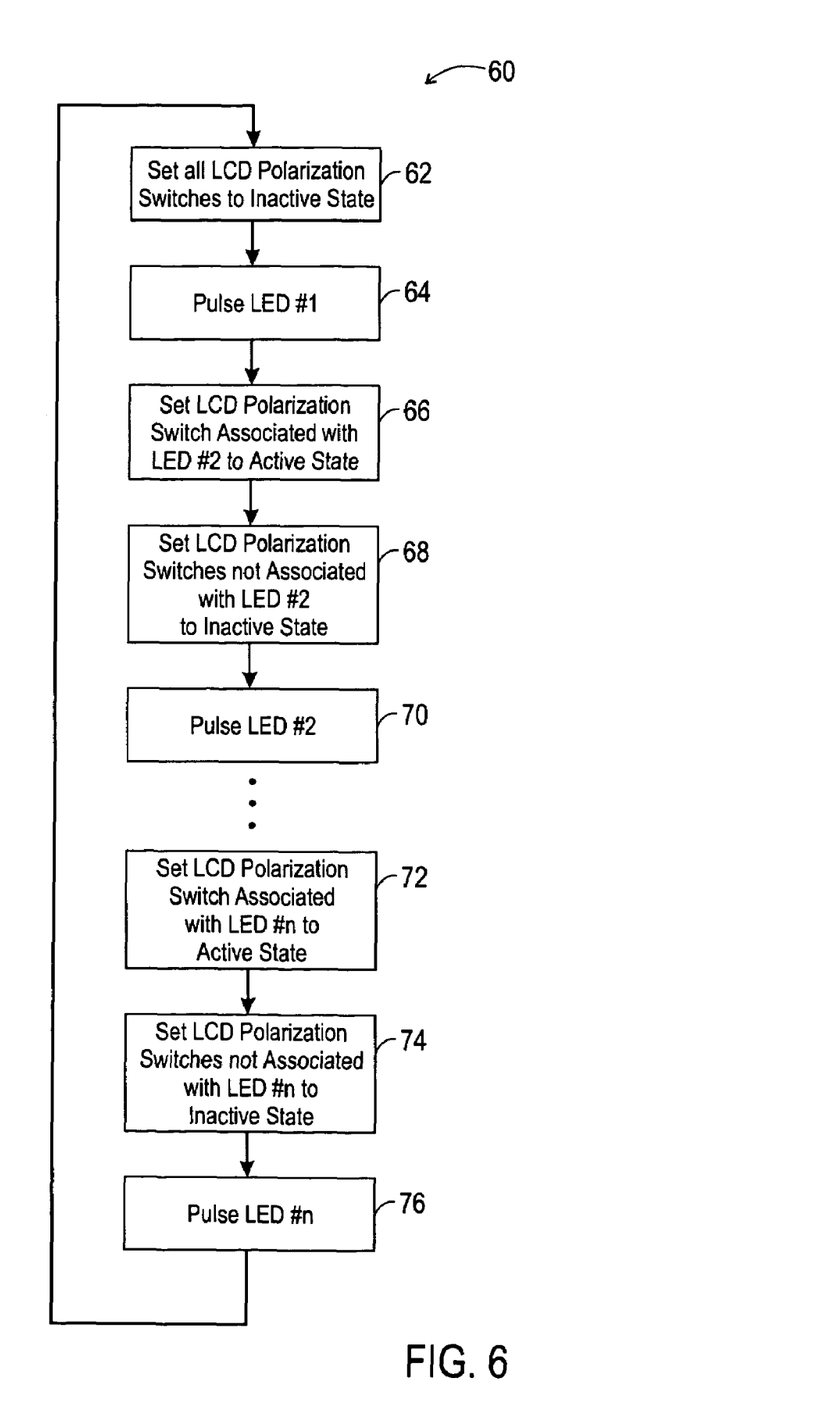
FIG. 6 is a flowchart illustrating exemplary technique for projecting a video image with a temporal LED combiner in accordance with embodiments of the present invention.
Figure 7:
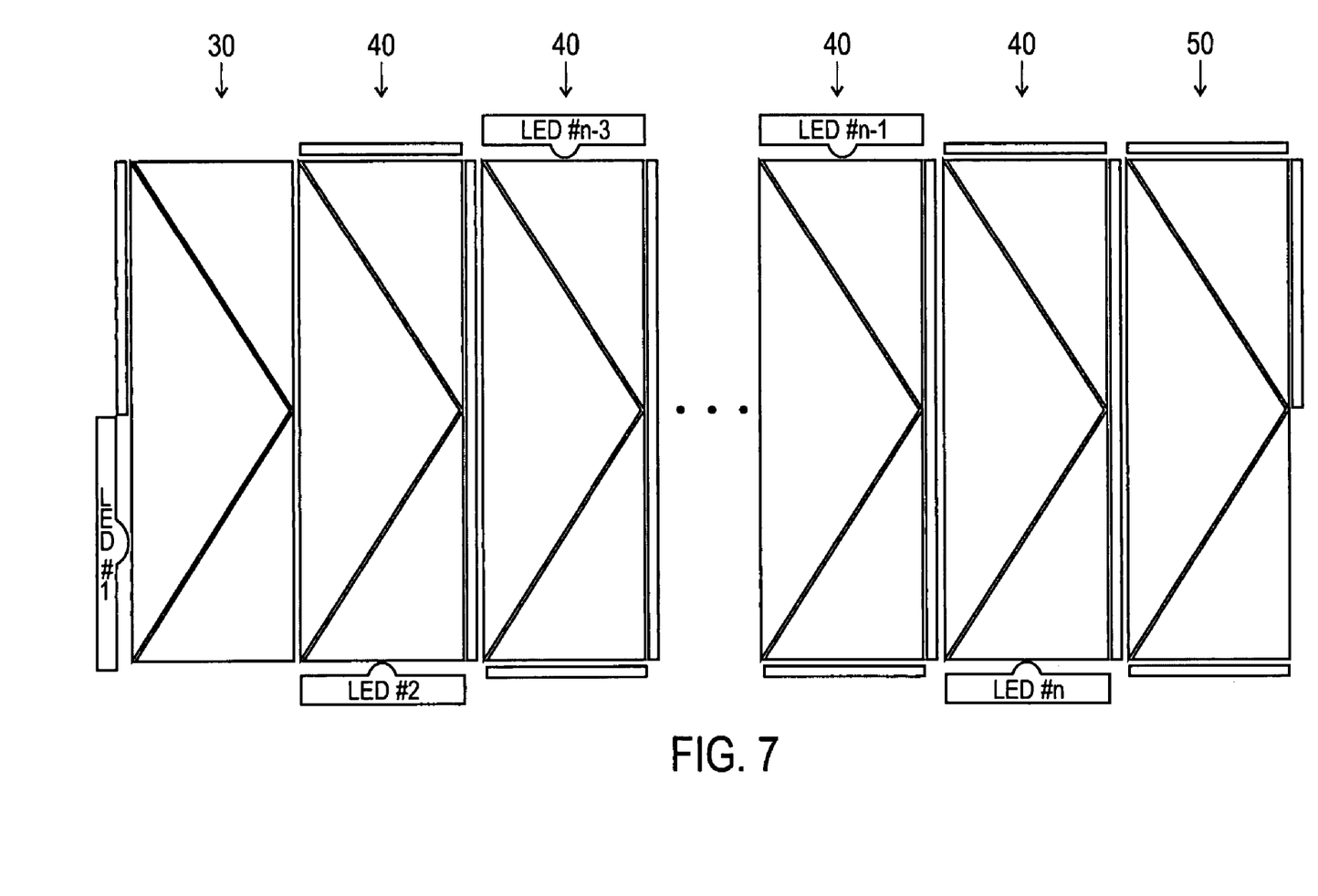
FIG. 7 is a diagram of an exemplary temporal LED combiner in accordance with embodiments of the present invention.

As described above, the starting block 30, one or more of the intermediate blocks 40, and the ending block 50 may be combined together to create the temporal LED combiner 12. FIG. 6 illustrates an exemplary technique 60 for projecting a video image with the temporal LED combiner 12 and FIG. 7 illustrates a diagram of the exemplary temporal LED combiner 12 in accordance with one embodiment. For simplicity, like reference numerals have been used to designate those features previously described in reference to FIGS. 1-5. It will be appreciated that FIG. 7 illustrates one possible embodiment of the temporal LED combiner 12. As such, in alternate embodiments, the location, orientation, or internal components of the starting block 30, the intermediate blocks 40, and the ending block 50 may be different.

As illustrated in FIG. 6, the technique 60 begins with the temporal LED combiner 12 setting all of its LCD polarizations switches to an inactive state, as indicated in block 62. When all of the LCD polarization switches are set to an active state, the temporal LED combiner 12 may pulse LED #1 at a duty cycle that enables the LED #1 to produce a sufficient amount of light to project a video image of a desired size, as indicated in block 64. Because all of the LCD polarization switches are set to an inactive state, the p polarized light produced by the starting block 30 will travel though each of the intermediate blocks 30 as p polarized light and then be converted into a beam of unpolarized light by the ending block 50. This beam of unpolarized light can then be shined onto the DMD 18 and then projected onto the screen 28 (see FIG. 1).

After LED #1 has been pulsed, the temporal LED combiner 12 may set the LCD polarization switch associated with LED #2 to an active state, as indicated by block 66. Next, the temporal LED combiner 12 may set the LCD polarization switches not associated with LED #2 to an inactive state, as indicated in block 68. Next, the temporal LED combiner may pulse LED #2, as indicated in block 70. Because the LCD polarization switch associated with LCD #2 is an active state, it will cause LED #2's intermediate block 40 to produce p polarized light as described above in reference to FIG. 3. However, because the other LCD polarization switches within the temporal LED combiner 12 are set to an inactive state, the p polarized light produced by LED number 2's intermediate block will pass through the other LCD polarization switches without changing polarity. As such, when the p polarized light the ending block 50, it can converted into unpolarized light and then projected onto the screen 28 as a video image.

As illustrated in FIG. 6, the technique described above with regard to block 66-70 may be repeated for each of n number of intermediate blocks 40 as indicated by blocks 72-76. By properly coordinating the pulses of the LEDs and the activation of the LCD polarization switches, it is possible to generate a continuous or nearly continuous beam of LED-generated light at a brightness level greater than a single LED.

It will be appreciated that the technique 60 describes only one possible embodiment of a technique for projecting a video image with the temporal LED combiner 12. In alternate embodiments, other techniques or configurations may be used. For example, with minor modifications the starting block 30 and the intermediate blocks 40 could be configured to generate s polarized light, and the ending block 50 configured to convert this s polarized light in unpolarized light. Further, in still other embodiments, the configuration and/or relative location of the LEDs 32, the PBS prisms 34, the one-quarter wave plates 36, and the LCD polarization may be different.

What is claimed is:

1. A video unit (10) comprising:
    a first component (30) configured to create a first beam of light with a first polarity;
    a second component (40) configured to create a second beam of light with a second polarity subsequent to the creation of the first beam of light; and
    a third component (42) configured to allow the first beam of light pass through it without a change of polarity and to change the polarity of the second beam of light to the first polarity.

2. The video unit (10) of claim 1, comprising a fourth component (50) configured to convert the first beam of light into unpolarized light.

3. The video unit (10) of claim 1, wherein the first component comprises a light emitting diode (32).

4. The video unit (10) of claim 3, wherein the first component comprises a polarizing beam splitter (34).

5. The video unit (10) of claim 4, wherein the first component comprises a one-quarter wave plate (36).

6. The video unit (10) of claim 1, wherein the third component comprises a light crystal diode polarization switch (42).

7. The video unit (10) of claim 1, comprising a digital micromirror device (18).

8. A method comprising:
    setting a plurality of liquid crystal display polarization switches to an inactive state;
    pulsing a first light source (32);
    setting a liquid crystal display polarization switch (42) associated with a second light source (32) to an active state; and
    pulsing the second light source (32).

9. The method of claim 8, wherein setting the plurality of the liquid crystal display polarization switches (42) to the inactive state comprises configuring the plurality of liquid crystal display polarization switches (42) to allow light to pass through them without changing the polarity of the light.

10. The method of claim 8, wherein pulsing the first light source (32) comprises pulsing a light emitting diode (32).

11. The method of claim 10, wherein pulsing the light emitting diode (32) comprises pulsing the light emitting diode (32) with a duty cycle less then $1/3$.

12. The method of claim 10, wherein pulsing the light emitting diode (32) comprises pulsing the light emitting diode (32) with a duty cycle less then $1/6$.

13. The method of claim 10, wherein setting the liquid crystal display polarization switches (42) to the active state comprises configuring the liquid crystal display polarization switch (42) to change the polarity of a beam of light produced by the second light source (32).

14. The method of claim 10, comprising dividing a beam of light produced by the first light source (32) into an s polarized beam of light and a first p polarized beam of light.

15. The method of claim 14, comprising converting the s polarized beam of light into a second p polarized beam of light.

16. The method of claim 15, comprising:
    converting the second p polarized beam of light back into s polarized beam of light;
    combining the s polarized beam of light with the first p polarized beam of light to produce unpolarized light; and
    projecting the unpolarized light onto a digital micromirror device.

17. A video unit (10) comprising:
    means for setting a plurality of liquid crystal display polarization switches to an inactive state;
    means for pulsing a first light source (32);
    means for setting a liquid crystal display polarization switch (42) associated with a second light source (32) to an active state; and
    means for pulsing the second light source (32).

18. The video unit (10) of claim 17, comprising means for dividing a beam of light produced by the first light source (32) into an s polarized beam of light and a first p polarized beam of light.

19. The video unit (10) of claim 17, comprising means for converting the s polarized beam of light into a second p polarized beam of light.

20. The video unit (10) of claim 17, comprising:
    means for converting the second p polarized beam of light back into s polarized beam of light;
    means for combining the s polarized beam of light with the first p polarized beam of light to produce unpolarized light; and
    means for projecting the unpolarized light onto a digital micromirror device.

* * * * *